United States Patent [19]

Ludwig

[11] Patent Number: 4,665,100

[45] Date of Patent: May 12, 1987

[54] PROCESS FOR FORMULATING A SYNTHETIC DRUG FOR USE IN ANIMAL FEED, AND RESULTING FORMULATION

[75] Inventor: Nelson H. Ludwig, Greenfield, Ind.

[73] Assignee: Eli Lilly and Company, Indianapolis, Ind.

[21] Appl. No.: 466,703

[22] Filed: Feb. 15, 1983

Related U.S. Application Data

[63] Continuation of Ser. No. 243,282, Mar. 13, 1981, abandoned.

[51] Int. Cl.⁴ .................. B29C 23/00; A61K 9/16
[52] U.S. Cl. ..................... 514/778; 514/951; 264/15; 264/141; 264/143; 264/118
[58] Field of Search ........... 424/14, 15, 20, 120; 426/516, 518, 623, 636; 264/15.118, 141, 143; 514/951, 778

[56] References Cited

U.S. PATENT DOCUMENTS

| | | | |
|---|---|---|---|
| Re. 27,214 | 11/1971 | Nakahara | 264/15 |
| 3,400,185 | 9/1968 | Kohnle et al. | 424/20 |
| 3,579,719 | 5/1971 | Moriya | 18/1 |
| 3,758,679 | 9/1973 | Seidler | 424/19 |
| 4,048,268 | 9/1977 | Ludwig | 264/15 |
| 4,136,145 | 1/1979 | Fuchs et al. | 264/164 |
| 4,144,050 | 3/1979 | Frensch et al. | 514/951 |
| 4,211,781 | 7/1980 | Chapman | 424/250 |
| 4,284,506 | 8/1981 | Tetenbaum et al. | 264/257 |
| 4,447,421 | 5/1984 | Klothen | 514/30 |

FOREIGN PATENT DOCUMENTS

EP41114 12/1981 European Pat. Off. .

OTHER PUBLICATIONS

Reynolds, A. "A New Technique . . . Spherical Particles", Mfg. Chemist & Aerosol News, 41, 40–43 (1970).
Conine et al., "Preparation of . . . Spheres.", Drug and Cosmetic Industry, 106, 38–41 (1970).

*Primary Examiner*—Ronald W. Griffin
*Attorney, Agent, or Firm*—Joseph A. Jones; Leroy Whitaker

[57] ABSTRACT

A method of formulating a synthetic drug for use in animal feed, for the purpose of reducing carry-over of the synthetic drug to subsequent lots of animal feed in the feed mill.

2 Claims, No Drawings

PROCESS FOR FORMULATING A SYNTHETIC DRUG FOR USE IN ANIMAL FEED, AND RESULTING FORMULATION

This application is a continuation of application Ser. No. 243,282, filed 3/13/81, now abandoned.

BACKGROUND OF THE INVENTION

The present invention relates to a method of formulating a synthetic drug for use in animal feed, for the purpose of reducing carryover of the synthetic drug to subsequent lots of animal feed in the feed mill.

A growing concern has developed in the animal feed industry concerning the carryover of drugs in medicated animal feeds. Sulfamethazine, as an example of such a synthetic drug, exhibits electrostatic properties which cause it to cling to feed mill equipment so that when the equipment is emptied, and a different lot of animal feed is added to the mill equipment for processing, undesired sulfamethazine residues appear in that subsequent lot of animal feed. This also creates the problem of producing a uniform formulation, as well, if the subsequent lot of medicated animal feed is intended to contain sulfamethazine. A recent study has shown increased sulfamethazine residues in pork liver and kidney due to this drug carryover problem.

There is little prior art concerning the reduction of cross-contamination of feed mill equipment by medicated feeds. Chapman, in U.S. Pat. No. 4,211,781, teaches a process for preparing a substantially dustless animal feed premix by merely mixing the active ingredient with a non-toxic oil and an edible carrier.

Ludwig, in U.S. Pat. No. 4,048,268, teaches substantially the same process used in the present invention. The purpose of that invention was, however, related to a method of stabilizing the microorganism produced antibiotic tylosin, which is susceptible to deterioration causing a considerable loss of potency, but having no carryover problem.

The apparatus typically used in the process of the present invention is disclosed in U.S. Pat. No. RE27214, or U.S. Pat. No. 3,579,719. These patents teach the use of that apparatus for making spherical granules.

This invention greatly reduces the carryover of a synthetic drug in animal feed mill operations.

SUMMARY OF THE INVENTION

The purpose of this invention is to provide a method of formulating a synthetic drug for use in feed which will reduce the carryover of the drug from one lot of feed to a subsequent lot in feed mill operations. The process involves intimately mixing the drug with a carrier, a physiologically-acceptable binder, and water, extruding the mixture through a perforated plate having relatively small aperatures into elongated strands of extrudate, and contacting the elongated strands of extrudate with a moving frictional plate, imparting motion to said extrudate and developing a tumbling, rolling bed thereof wherein the strands are reduced to nearly spherical particles, called minigranules, drying them to remove excess moisture, and sieving the minigranules through meshed wire screens to insure proper particle size.

DETAILED DESCRIPTION OF THE INVENTION

The present invention provides a method for minimizing the carryover of a synthetic drug in animal feed mill equipment. The steps of the process include (A) intimately admixing the synthetic drug with (1) a physiologically-acceptable carrier and (2) water; (B) blending the intimate admixture of (A) with (3) a physiologically-acceptable binder;(C) extruding the thus blended admixture under pressure through a perforated plate forming an extrudate of elongated strands having a length generally exceeding the cross-sectional dimension; (D) reducing the strands of extrudate into nearly spherical particles; (E) removing the excess water from the particles (D); and (F) sieving to form uniform particles termed "minigranules".

The term "synthetic drug" has a specific definition in connection with this application. "Synthetic" refers to the method of preparation of the compound, meaning the drug was completely prepared using chemical compounds, and no part of the drug was fermentation derived. "Drug" refers to an animal medicament, a substance for veterinary use in animals such as a growth promotant, coccidiostat, antimicrobial, antibacterial, anthelmintic, or antihistomonad.

The term "feed premix", as used in the present application, is defined as the synthetic drug, in the form of the minigranule alone or, more typically, diluted with a suitable edible diluent. Either type of premix is intended to be further diluted with the animal ration, and the final feed mixture obtained then may be formed into pellets, if desired.

The carrier used in the first step of the present process can be any physiologically-acceptable carrier. Suitable physiologically-acceptable carriers include finely-divided materials derived from cereal grains; oil seeds and their by-products; forages, silages, and their by-products; by-products of the lumber, sugar, fruit juice, and vegetable juice industries; clays such as diatomaceous earth; and vermiculite. Because of their widespread availability, solvent-extracted soybean feed, soybean mill run, corn flour, milo flour, wheat middlings, or alfalfa meal are preferred. Especially preferred carriers for use in this novel process include solvent-extracted soybean feed, corn flour, and alfalfa meal, with the carrier of choice being solvent-extracted soybean feed. The carrier may be used in from about 50 to about 98 percent on a dry weight basis to form the admixture.

Physiologically-acceptable binders found useful in preparing the admixture include starch, gelatin, polyvinylpyrrolidone, soy protein, cellulose, bentonite, acacia powder and lignin sulfonate. Of these, starch is the binder of choice. However, as noted below in Example 5, it is not alays necessary to add a separate binder since another component may additionally serve as a binder. The binder may be present in from about 1 to about 10 percent by weight of the admixture on a dry weight basis, preferably from about 3 to about 5 percent by weight on a dry weight basis.

The exact percentage of the synthetic drug in minigranules prepared according to the present invention will vary somewhat with the identity of carrier and other factors. Generally, the minigranules will contain from about 1 to about 40 percent of the synthetic drug on a dry weight basis. Where the carrier is solvent-extracted soybean feed or alfalfa meal, the full range of 1 to 40 percent is possible. However, with certain other carriers, less than 40 percent of the synthetic drug is possible. For example, those minigranules prepared using a carrier selected from the group consisting of corn flour, milo flour, soybean mill run, and wheat middlings, can contain from about 1 to about 25 percent of the synthetic drug on a dry weight basis. These differences in percent weight content of the drug are due in part to the variation in ability of the carriers to absorb moisture and to thereby form a suitable admixture for processing through the extruder and thence to the forming of the minigranules from the strands of extrudate.

The percent of synthetic drug, physiologically-acceptable carrier, and binder is calculated on a dry weight basis and is considered without reference to the water or other components present. Thus, these three components together constitute 100 percent of the composition for purposes of calculating individual percentages.

The process of the present invention used to control the carryover of a synthetic drug is described in detail below.

In step (A) of the process, the synthetic drug, or a suitable physiologically-acceptable salt thereof, a suitable carrier, and some water, are blended together in a blender. Suitable type blenders include a ribbon blender, tumbling cone, twin shell blender, vertical mixer, paddle mixer, sigma arm mixer, pony mixer, or the like. Preferably, the mixing is done in a ribbon blender. Although unnecessary in production type equipment, it may be desirable in pilot plant equipment to empty the ribbon blender into a suitable container, and the sides, bottom and blades of the ribbon blender be scraped clean. All of the material is then returned to the blender for additional mixing. Thus, step (A) of the novel process is carried out by intimately blending a mixture comprising from about 1 to about 40 percent by weight on a dry weight basis of the synthetic drug, about 50 to about 98 percent by weight on a dry weight basis of a carrier selected from the group described above, and water, to form an intimate admixture.

When step (A) is finished, that is, when the blending is adjudged to be complete, step (B) of the process is carried out. The binder, along with some water, is added to the admixture in the blender and mixing continued for as long a time as necessary to provide intimate mixing of the various components with one another. The amount of binder required is calculated on a dry weight basis and equals from about 1 to about 10 percent by weight, preferably from about 3 to about 5 percent by weight of the components of the product of step (A). It has been found that reasonably prolonged mixing does not adversely affect the properties of the material being blended for processing in the extruder, the next step in the process. At the conclusion of this mixing, the mixture appears as a moist but free-flowing particulate material which forms a dough when compressed. This moist but free-flowing particulate material may have an overall moisture content of from about 43 to about 50 percent by weight, most typically and preferably about 47 percent by weight.

The admixture prepared as described above is next introduced into an extruder. Extruders are well known to the art. Generally, the material to be extruded is fed into a hopper over one end of a rotating screw auger disposed in a cylinder. The screw auger transports the material to be extruded the length of the cylinder and discharges said material into an annular space defined on one or more sides by a perforated plate. The material is forced through the perforations of the plate by the pressure created by transporting more of said material into said annular space than can be confined therein. The faster the material accumulates in the annular space, the greater the pressure being exerted to force said material through the perforations in said plate.

The screen or perforated plate through which the admixture is extruded suitably contains round perforations of from about 0.5 mm. to about 1.5 mm. in diameter. The perforation diameter of choice in the plate is 0.8 mm. This diameter size of extrudate results in a range of particle sizes which is most useful for uniform distribution in animal feeds.

The elongated strands of extrudate produced by the extruder will vary in length from something a little more than the cross sectional dimension to a measurement many times the breadth of said strand. The length of strands will vary with the relation of the perforated plate to the vertical. A plate set on the vertical will form strands having a shorter length than those coming from a plate facing down. Furthermore, the cross sectional dimension of the perforations also influences the length of the strands. In any event, the strands of extrudate do not tend to stick together under normal handling and can be spread on trays for drying or added directly to a particle-forming apparatus without encountering aggregation, agglomeration, coalescence, or disintegration.

While it is possible to remove the excess moisture from the strands of extrudate prior to forming the minigranules, it is preferred in the present process that such particles must be formed before the excess moisture is removed. The extrudate strands are therefore divided into particles, the length of which particles varies from about 1.0 to about 2.5 times their cross-sectional dimension.

The division of the extrudate strands into short lengths is accomplished by contacting the strands with a moving frictional plate, said plate being of either a flat or curved form and having either a smooth or serrated surface, preferably the latter, said frictional plate moving at a velocity sufficient to overcome the inertia of said extrudate. The moving frictional plate sets up a rolling, tumbling bed of extrudate and in such bed, the elongated strands are divided into particles of from about 1.0 to about 2.5 times their cross-sectional dimension in length. Illustrative of devices wherein this operation can be performed are: (a) coating pans used in pharmaceutical and confectionary industries and well known in the art, which pans can be operated satisfactorily whether set in a vertical plane or tilted at an angle; (b) granulating pans, also well known in the art, such as those used in pelletizing "taconite" iron ore for shipment and characterized by being of large diameter and with a relatively low integral circumferential side wall confining the particles on the flat surface (these pans are generally operated at a slight angle, perhaps 15° off the horizontal and are rotated slowly); (c) an apparatus for dividing moist plastic extrusions into short lengths, comprising a stationary vertical cylindrical container having a rotatable flat or outwardly curved circular frictional plate disposed therein, said plate being disposed on a shaft at approximately a right angle thereto, such device being the subject of U.S. Pat. No. RE27214, or U.S. Pat. No. 3,579,719.

Preferably, the extrudate reduction is accomplished using the device of (c) above by: (1) contacting said extrudate with a circular frictional plate mounted horizontally in a vertically disposed stationary cylindrical vessel; (2) rotating said plate at a speed sufficient to overcome the inertia of said extrudate; (3) imparting velocity to said extrudate such that said extrudate moves in a curved path toward the periphery of said plate; (4) establishing a moving doughnut-shaped ring of said extrudate; and (5) continuing such movement until said extrudate is reduced to particles of from about 1.0 to 2.5 times their cross-sectional dimension in length. The circular frictional plate is suitably operated at speeds ranging from 1200 to about 1800 rpm.

The minigranules produced in the previous step are dried until they contain from about 5 to about 12 percent, preferably about 10 percent residual moisture.

The drying operation can be suitably accomplished by spreading said particles on trays and air drying at room temperature; by kiln drying at temperatures up to about 70° C.; or by loading said particles into a fluidized-bed dryer and blowing warm (approximately 70° C.) dry air through the fluidized bed of said particles, this latter being the method preferred.

The final step in this carryover control method is the necessity to pass the dried minigranules over meshed wire screens to remove granules greater than 20 mesh and less than 80 mesh. The acceptable particles collected will range in size from 0.85 mm to 0.18 mm in diameter.

The dust-free minigranules containing the synthetic drug now possess the proper characteristics to greatly reduce the problem of carrying over the drug to subsequent feed lots.

A number of commercially available synthetic drugs may be used in the process taught by this invention to reduce carryover of those drugs in feed mills. Representative examples include, but are not limited to:

acetyl sulfamethoxypyridazine
$N^1$-acetylsulfanilamide
acetyl sulfisoxazole
amprolium
arprinocid
arsanilic acid
buquinolate
carbadox
carbarsone
clopidol
coumaphos
decoquinate
dibutyltin dilaurate
dichlorvos
dimetridazole
dinitolmide
ethopabate
furaltadone
furazolidone
halofuginone
ipronidazole
levamisole hydrochloride
melengestrol acetate
nicarbazin
nifuraldezone
nitarsone
nitrofurantoin
nitrofurazone
nitromide
phenothiazine
phthalylsulfathiazole
piperazine
pyrantel
robenidine hydrochloride
ronidazole
roxarsone
sodium arsanilate
succinylsulfathiazole
sulfabenz
sulfabenzamide
sulfabromomethazine
sulfachloropyrazine
sulfachloropyridazine
sulfadiazine
sulfadiazine sodium
sulfadimethoxine
sulfaethidole
sulfaethoxypyridazine
sulfaguanidine
sulfamerazine
sulfamerazine sodium
sulfamethazine
sulfamethizole
sulfamethoxypyridazine
sulfamoxole
sulfanilamidomethanesulfonic acid triethanolamine salt
sulfanilic acid
sulfanitran
sulfaphenazole
sulfapyrazine
sulfapyridine
sulfaquinoxaline
sulfarsphenamine
sulfathiazole
sulfathiazole sodium
sulfazamet
sulfisomidine
sulfisoxazole
thiabendazole
and the like.

The process of the present invention may be used not only for a synthetic drug alone, and its physiologically-acceptable salts, but also for synthetic drugs in combination with fermentation derived antibiotics.

The following examples further illustrate this invention.

EXAMPLE 1

Finely ground solvent-extracted soybean feed (carrier), 918 g., was put into a small ribbon mixer and combined with 375 g. sulfamethazine powder. To 873 ml. water was added the mixture and the mixer was run for about 10 minutes. The mixer was emptied into a suitable container and the sides, bottom and blades of the mixer were scraped clean. All of the material was then returned to the mixer for an additional 10 minutes of mixing.

A binder was prepared by mixing 68 g. starch with 68 ml. cold water and then adding 272 ml. boiling water while stirring. This procedure provided adequate and uniform hydrolysis of the starch. The hydrolyzed starch was then added to the material in the mixer, and 15 minutes of mixing was carried out. At the end of the mixing time, the mixture appeared as a moist but free-flowing particulate material which formed a dough when compressed. The mixture had a moisture content of about 47 percent.

Using an EXD-60 double screw extruder, this free-flowing particulate material was extruded through 0.8 mm round perforations into elongated strands.

The elongated strands of extrudate were removed from the extruder and contacted with a circular frictional plate mounted horizontally in a vertically disposed stationary cylindrical vessel. The plate was rotated at a speed of about 1800 rpm., imparting a velocity to the extrudate sufficient to overcome the inertia of said extrudate and to establish a moving doughnut-shaped ring of said strands of extrudate. The rotational movement was continued for about 30 seconds, or until said strands of extrudate were divided into particles of from about 1.0 to about 2.5 times their cross-sectional dimension in length. The particles were then removed and dried in a fluid-bed type dryer at a temperature of up to 60° C., over a period of about 15 minutes. The particles, or minigranules, after drying, had a moisture content of about 10 percent.

The particles containing sulfamethazine were finally passed over 20 and 80 mesh wire screens. This gave acceptable particles ranging in size from 0.85 mm. to 0.18 mm. in diameter containing sulfamethazine at a rate of about 125 g. of sulfamethazine per pound.

EXAMPLE 2

2082 g. solvent-extracted soybean feed was added to a ribbon mixer along with 3397 g. tylosin phosphate concentrate and 1500 g. sulfamethazine powder. To this was added 1699 ml. water and the mixer was run for about 10 minutes. The mixer was emptied and scraped clean. All of the material was then returned to the mixer for an additional 10 minutes of mixing.

The binder was prepared by mixing 163 g. starch powder with 163 ml. water at room temperature and then adding 652 ml. boiling water. This material was added to the material in the mixer and an additional 15 minutes of mixing was performed. After mixing, the mixture appeared as a moist but free-flowing particulate material with a moisture content of 45%.

Using an EXD-60 double screw extruder, the free-flowing particulate was then extruded through 0.5 mm. round perforations into elongated strands.

The elongated strands of extrudate produced were contacted with a circular frictional plate mounted horizontally in a vertically disposed stationary cylindrical vessel. The plate was rotated at a speed of about 1800 rpm., imparting a velocity to the extrudate sufficient to overcome the inertia of said extrudate and to establish a moving doughnut-shaped ring of said strands of extrudate. The rotational movement was continued for about 30 seconds or until said strands of extrudate were divided into particles of from about 1.0 to about 2.5 times their cross-sectional dimension in length. The particles were then removed and dried in a fluid-bed dryer at about 50° C. for 30 minutes. The dried minigranules were sieved through 20 mesh and 80 mesh wire screens, said particles then containing tylosin and sulfamethazine at a rate of about 125 g. of each per pound.

EXAMPLE 3

To a large ribbon mixer was added 6.659 kg. solvent-extracted soybean feed with 2.841 kg. sulfamethazine and 6.368 l of water. The mixer was run for about 10 minutes, emptied and scraped clean. All of the material was then returned to the mixer for an additional 10 minutes of mixing.

The binder was prepared by mixing 500 g. of starch with 500 ml. water at room temperature and then adding 2 l of boiling water while stirring. The binder was then added to the material in the mixer and mixed for about 15 minutes. At the end of the mixing time, the mixture appeared as a moist but free-flowing particulate material which formed a dough when compressed. The mixture had a moisture content of about 47 percent.

Using an EXD-60 double screw extruder, this free-flowing particulate material was extruded through 0.8 mm. round perforations into elongated strands.

The elongated strands of extrudate were removed from the extruder and contacted with a circular frictional plate mounted horizontally in a vertically disposed stationary cylindrical vessel. The plate was rotated at a speed of about 1800 rpm., imparting a velocity to the extrudate sufficient to overcome the inertia of said extrudate and to establish a moving doughnut-shaped ring of said strands of extrudate. The rotational movement was continued for about 20 seconds, or until said strands of extrudate were divided into particles of from about 1.0 to about 2.5 times their cross-sectional dimension in length. The particles were then removed and dried in a fluid-bed type dryer at a temperature of up to 70° C., over a period of about 15 minutes. The particles, or minigranules, after drying, had a moisture content of about 10 percent. These minigranules were finally passed over 20 mesh and 80 mesh wire screens to yield acceptable particles in the size range from 0.85 mm. to 0.18 mm. in diameter. The minigranules contained sulfamethazine, as determined by assay, at a rate of 136.2 g. per pound (theoretical rate 125 g. per pound).

EXAMPLE 4

A 9.988 kg. quantity of solvent-extracted soybean feed was added to a ribbon mixer. To this was added 4.262 kg. sulfamethazine and 9.552 l of water and the mixer was run for about 10 minutes., emptied and scraped clean. All of the mixture was then put back into the bowl and mixed for an additional 10 minutes.

A binder was prepared by slurrying 750 g. starch in 750 ml. water at room temperature, and then adding 3 l boiling water and stirring. The hydrolyzed starch was then added to the material in the mixer, and mixing was carried out for 15 minutes. This dough, following mixing, had a moisture content of 47 percent.

The free-flowing particulate material, or dough, was extruded using an EXD-60 double screw extruder. The dough was extruded through 0.8 mm. round perforations into elongated strands.

The elongated strands of extrudate were removed from the extruder and contacted with a circular frictional plate mounted horizontally in a vertically disposed stationary cylindrical vessel. The plate was rotated at a speed of about 1800 rpm., imparting a velocity to the extrudate sufficient to overcome the inertia of said extrudate and to establish a moving doughnut-shaped ring of said strands of extrudate. The rotational movement was continued for about 20 seconds, or until said strands of extrudate were divided into particles of from about 1.0 to about 2.5 times their cross-sectional dimension in length. The particles were then removed and dried in a fluid-bed type dryer at a temperature of up to 70° C., over a period of about 15 minutes. The minigranules at this point had a moisture content of 10 percent. The particles were then sieved using 20 mesh and 80 mesh wire screens giving acceptably sized particles containing sulfamethazine, as determined by assay, at a rate of 130.4 g. per pound (theoretical rate 125 g. per pound).

EXAMPLE 5

To a small ribbon mixer was added 310 g. of a dried mycelial cake containing monensin, 50 g. nicarbazin and 15 g. mineral oil and was mixed until the oil was uniformly dispersed. To this mixture was added 125 g. solvent-extracted soybean feed and 195 ml. water, mixed for 10 minutes, emptied and scraped clean. A binder is not necessary in this minigranule because of the natural consistency of the mycelial cake. The mixture had a moisture content of about 28 percent.

Using an EXD-60 double screw extruder, this free-flowing particulate material was extruded through 0.8 mm. round perforations into elongated strands.

The elongated strands of extrudate were removed from the extruder and contacted with a circular frictional plate mounted horizontally in a vertically disposed stationary cylindrical vessel. The plate was rotated at a speed of about 1800 rpm., imparting a velocity to the extrudate sufficient to overcome the inertia of said extrudate and to establish a moving doughnut-shaped ring of said strands of extrudate. The rotational movement was continued for about 20 seconds, or until said strands of extrudate were divided into particles of from about 1.0 to about 2.5 times their cross-sectional dimension in length. The particles were then removed and dried in a fluid-bed type dryer at a temperature of 60° C. The minigranules were finally passed over 20 mesh and 80 mesh wire screens to yield acceptable particles in the size range from 0.85 mm. to 0.18 mm. in diameter. The minigranules contained nicarbazin and monensin at a rate of about 100 g. per kilogram each.

Cross Contamination Study

A trial was conducted at a noncommercial feed mill to compare the unintentional contamination of non-medicated feedstuffs by two tylosin-sulfamethazine premixes.

Formulation A comprises a portion of a commercial tylosin-sulfamethazine premix, referred to as Tylan 40 Sulfa Premix. This formulation was prepared by combining tylosin, as prepared by the process described by Ludwig in U.S. Pat. No. 4,048,268 (used to impart stability to the antibiotic), hereafter referred to as granulated tylosin concentrate, and untreated sulfamethazine powder. Formulation B was prepared by mixing granulated tylosin concentrate, identical to that in formulation A, and sulfamethazine, as prepared in Examples 3 and 4 of the present application, referred to as granulated sulfamethazine. Each formulation was diluted with fine rice hulls and antidusting oil which gave premixes with tylosin and sulfamethazine concentrations of about 40 g. per pound each. Table 1 gives the ingredients of the two premixes evaluated in the cross contamination study.

TABLE 1

|  | Amount Used (kg.) |
|---|---|
| Sulfamethazine Powder Premix | |
| Granulated tylosin concentrate | 7554.5 |
| Sulfamethazine powder | 2349.65 |
| Fine rice hulls | 13608.0 |
| Spray oil (coparaffinate) | 306.3 |
| Granulated Sulfamethazine Premix | |
| Granulated tylosin concentrate | 15.78 |
| Granulated sulfamethazine (from Example 3 at 136.2 g./lb.) | 7.09 |
| Granulated sulfamethazine (from Example 4 at 130.4 g./lb.) | 6.98 |
| Fine rice hulls | 14.61 |
| Antidusting oil | 0.907 |

Each premix was then added to 3 separate quantities of swine feed. Each lot of medicated swine feed weighed 3000 lbs. and gave a concentration of 100 g./ton (110 ppm) of tylosin and sulfamethazine in the 3 lots of medicated swine feed formulated with sulfamethazine powder and the 3 lots of medicated swine feed formulated with granulated sulfamethazine. An unmedicated lot of swine feed was analyzed to determine the background level of sulfamethazine in it, as well.

The seven 3000 lb. lots of swine feed were mixed, conveyed, pelleted and bagged according to normal mill procedures. After each lot of medicated swine feed was mixed, the horizontal paddle mixer was opened and the remaining feed was removed. The whole system was then flushed with 1000 lb. of a 80% ground corn—20% sugar beet pulp mixture (flush). This was then mixed, pelleted and bagged in the same way as the feed. Ten samples were taken from each lot, one from every sixth 50 lb. bag of medicated feed, and one from every other 50 lb. bag of flush. Flush samples were assayed for sulfamethazine by the modified Brattan-Marshall method while feed samples were assayed by the method described by Tishlor in *J. Agr. Food Chem.* 16 (1):50–53.

Table 2 summarizes the sulfamethazine assays for this trial. The Bratton-Marshall assay, used to detect low levels of sulfamethazine, can be used to quantify levels of less than 1 ppm. The background sulfamethazine levels (as measured in the unmedicated feeds and flushes) ranged from 0.06 to 0.30 ppm., and levels of sulfamethazine below 0.5 ppm. are considered indistinguishable from background levels. The sulfamethazine persistence ratio (SPR) expresses the amount of sulfamethazine carried over to the unmedicated flush as a percentage of the sulfamethazine in the medicated animal feed preceding it.

$$SPR = \frac{g \text{ sulfamethazine in unmedicated flush}}{g \text{ sulfamethazine in medicated animal feed lot}} \times 100\%$$

Comparison of the SPR for the two formulations shows that carryover of sulfamethazine into unmedicated materials was reduced by 54% with the use of granulated sulfamethazine as prepared by the method described in the present invention.

TABLE 2

| Formulation | Animal Feed No. | Feed Assays Sulfamethazine Av. g/ton | Feed Assays Sulfamethazine g/3000 lb. lot | Flush Assays Sulfamethazine g/ton | Flush Assays Sulfamethazine g/1000 lb. lot | Sulfamethazine Persistance Ratio (%) |
|---|---|---|---|---|---|---|
| Unmedicated | 1 | <1 | | <1 | | |
| Sulfamethazine | 2 | 91.6 | 137.4 | 2.4 | 1.2 | 0.87 |
| Powder | 3 | 95.1 | 142.6 | 3.2 | 1.6 | 1.12 |

TABLE 2-continued

| Formulation | Animal Feed No. | Feed Assays Sulfamethazine Av. g/ton | Sulfamethazine g/3000 lb. lot | Flush Assays Sulfamethazine g/ton | Sulfamethazine g/1000 lb. lot | Sulfamethazine Persistance Ratio (%) |
|---|---|---|---|---|---|---|
| | 4 | 92.3 | 138.5 | 2.8 | 1.4 | 1.01 |
| | Average | 93.0 | 139.5 | 2.8 | 1.4 | 1.00 |
| Granulated | 5 | 102.1 | 153.2 | 1.2 | 0.60 | 0.39 |
| Sulfamethazine | 6 | 91.9 | 137.9 | 1.3 | 0.66 | 0.48 |
| | 7 | 107.4 | 161.1 | 1.6 | 0.80 | 0.50 |
| | Average | 100.4 | 150.6 | 1.4 | 0.69 | 0.46 |

I claim:

1. A substantially-dustless minigranule comprising from about 1 to 40 percent on a dry weight basis of sulfamethazine, or a physiologically-acceptable salt thereof, from about 50 to about 98 percent on a dry weight basis of a physiologically-acceptable carrier and from about 1 to about 10 percent on a dry weight basis of hydrolyzed starch, said minigranule ranging in size of from 0.85 mm to 0.18 mm in diameter and being from about 1.0 to 2.5 times its cross-sectional dimension in length.

2. A substantially-dustless minigranule comprising from about 1 to 40 percent on a dry weight basis of nicarbazin, from about 50 to about 98 percent on a dry weight basis of a physiologically-acceptable carrier and from about 1 to about 10 percent on a dry weight basis of hydrolyzed starch, said minigranule ranging in size of from 0.85 mm to 0.18 mm in diameter and being from about 1.0 to 2.5 times its cross-sectional dimension in length.

* * * * *